United States Patent [19]

Brodsky

[11] Patent Number: 5,526,485
[45] Date of Patent: Jun. 11, 1996

[54] JUST-IN-TIME DEBUGGING SYSTEM AND METHODS UNDER THE WINDOWS 3.0 AND WINDOWS 3.1 OPERATING SYSTEMS

[75] Inventor: Mark A. Brodsky, Redmond, Wash.

[73] Assignee: Microsoft Corporation, Redmond, Wash.

[21] Appl. No.: 323,372

[22] Filed: Oct. 13, 1994

[51] Int. Cl.[6] .................................................. G06F 11/00
[52] U.S. Cl. ............................................... 395/183.14
[58] Field of Search ............................ 371/19; 395/575, 395/183.14, 183.13, 183.15, 185.02; 364/267, 267.91

[56] References Cited

U.S. PATENT DOCUMENTS

| | | | |
|---|---|---|---|
| 5,226,162 | 7/1993 | Daw | 371/19 |
| 5,297,274 | 3/1994 | Jackson et al. | 371/19 |
| 5,313,616 | 5/1994 | Cline et al. | 371/19 |
| 5,357,628 | 10/1994 | Yuen | 395/575 |
| 5,428,618 | 6/1995 | Ueki et al. | 371/19 |

OTHER PUBLICATIONS

Yao, Paul, *Explore Previously Uncharted Areas of Windows[SM] Using the ToolHelp Library*, "MicroSoft Systems Journal," May–Jun. 1992, pp. 37–63.

Denning, "Threadz Observer (Windows Program Debugger)", EXE, vol. 4, No. 9, Mar. 1990 pp. 44, 46, 49. (See attached database copy).

*Primary Examiner*—Robert W. Beausoliel, Jr.
*Assistant Examiner*—Joseph E. Palys
*Attorney, Agent, or Firm*—Lee & Hayes

[57] ABSTRACT

The invention includes systems and methods for debugging an application program running under an operating system such as Windows® 3.0 or 3.1. Such an operating system allows registration of callback functions with an operating system exception handler. The operating system exception handler calls the registered callback functions in response to an exception generated by the application program until one of the callback functions indicates that the exception has been resolved. The invention includes a monitor program which is installed in program memory concurrently with the application program. The monitor program registers itself with the operating system exception handler to be called in response to an exception generated by the application program. When called, the monitor callback function finds the startup parameters of the application program which generated the exception and starts a debugging program, using the startup parameters. The debugging program, in accordance with normal characteristics of debugging programs, registers itself with the operating system exception handler and then yields to the operating system. The monitor program returns control to the operating system without indicating that the exception has been resolved. Thereafter, the exception handler calls the registered debugging program to initiate debugging of the application program which generated the exception.

34 Claims, 4 Drawing Sheets

JUST-IN-TIME DEBUGGING SYSTEM AND METHODS UNDER THE WINDOWS 3.0 AND WINDOWS 3.1 OPERATING SYSTEMS

TECHNICAL FIELD

This invention relates to methods of debugging application programs from within multi-tasking operating systems, and particularly from within such operating systems as Windows® 3.0 and Windows® 3.1 which do not integrate functions for automatically launching debugging programs in response to exceptions generated by application programs.

BACKGROUND OF THE INVENTION

Program debugging is an integral part of thorough software development. In the software development context, a "bug" is a program malfunction caused by a programming or logic error. A minor bug, such as a cursor that does not behave as expected, can be inconvenient or frustrating, even though it may not be damaging to information. More severe bugs can cause a program to stop responding to commands and might leave the user with no alternative but to restart the program. It is sometimes even necessary to reboot the computer to recover. Either of these alternatives might result in the loss of any work not already transferred to non-volatile data storage.

Because of the potential risk to important data, as well as the inconvenience and aggravation caused by program or system bugs, commercial application programs are tested and debugged as completely as possible before release. Such debugging requires not only identifying bugs by their symptoms, but also finding and correcting the programming errors that caused the bugs.

Various debugging systems have been developed for aiding programmers in finding sources of identified bugs. Some such debugging systems are hardware-based, requiring external connections to a target computer or microprocessor. However, software-based debugging systems are also effective, especially when working with reliable computer hardware which has already been thoroughly tested.

The rising complexity of microprocessors and operating systems has allowed debugging software to provide more capabilities than were previously possible. Modern multi-tasking computers and operating systems typically preclude or at least greatly reduce the possibility of an application program altering any program memory except its own. Thus, it is usually very difficult for a program to interfere with correct operation of other application programs or of the operating system itself. Accordingly, it is quite common to run a debugging program simultaneously with an application program which is to be debugged (a target program). When the operating system detects an error in the target program, the operating system can suspend the target program and pass control to the debugging program. The debugging program can then access memory locations, microprocessor registers, program counters, and other data to aid the programmer in finding the source of the error. The programmer can sometimes attempt on-the-fly fixes, and restart or single-step the program from the point where the error occurred.

One shortcoming of many debugging programs is that they must be loaded in program memory and running before the target program error occurs. This might be undesirable in many cases simply because of the system resources consumed by the debugging program. Furthermore, the presence of the debugging program in program memory, and the related consumption of resources, might have an effect on the target program, precluding effective debugging. More fundamentally, the programmer might simply have forgotten to initiate the debugging program. This shortcoming has been addressed in some operating systems such as Microsoft® Windows NT™. The Windows NT™ operating system has a mechanism referred to as "exception handling." When an exception occurs, for example a general protection fault or a page fault, the running application program is notified and given the opportunity to self-correct. This is called "first chance exception handling." If the application program cannot handle or correct the exception, the operating system attempts to handle it in a procedure called "last chance exception handling." If this is also unsuccessful, the Windows NT™ operating system has a built-in mechanism for starting a utility program which can "connect" to the errant application and extract information about the program in its faulty state before terminating it.

There are programs which make use of this built-in mechanism. For instance, a program called DRWATSN32.EXE is supplied with the Windows NT™ operating system. DRWATSN32.EXE generates a human readable ASCII file with various static information relating to state of the application program at the time of the exception. Also, there are development environments which operate with the Windows NT™ operating system to load, start, and initialize a debugging program to debug the application program, in response to an application program error, without terminating the application program. This latter tactic is much more flexible, since it gives a programmer the opportunity to interactively explore various data storage areas used by the application program and in some cases to restart the application program.

Unfortunately, the Windows® 3.1 operating system is not able to load and run a debugging program in response to a program error. Generally, the Windows® 3.1 operating system will simply terminate an application in response to a generated exception. The Windows® 3.1 operating system does, however, have facilities for passing control to a debugging program which is already loaded and running. Such facilities are provided in the operating system itself, and are accessed through a library of Windows® 3.1 functions and data structures called the Tool Helper library. The Tool Helper library ships with the Microsoft® Windows® Software Development Kit (SDK) version 3.1 (Tool Helper is contained within three files: a dynamic-link library TOOLHELP.DLL, an import library TOOLHELP. LIB, and an include file TOOLHELP.H). Tool Helper functions can also run under the Windows® 3.0 operating system.

The Tool Helper library includes functions which enable a programmer to trap certain system interrupts. Specifically, the Tool Helper library allows trapping the following interrupts:

| Name | Number | Meaning |
| --- | --- | --- |
| INT_DIV0 | 0 | Divide-error Exception |
| INT_1 | 1 | Debugger interrupt |
| INT_3 | 3 | Breakpoint interrupt |
| INT_UDINSTR | 6 | Invalid-opcode exception |
| INT_STKFAULT | 12 | Stack Exception |
| INT_GPFAULT | 13 | General protection violation |
| INT_BADPAGEFAULT | 14 | Page fault not caused by normal virtual-memory operation |
| INT-CTLALTSYSRQ | 256 | User pressed CTRL+ALT+SYSRQ |

Using the Tool Helper functions, a debugging program can be registered with the operating system to receive notifications when these interrupts occur. To register for such notifications, the debugging program calls a Tool Helper function called InterruptRegister(), and supplies an argument consisting of a pointer to an interrupt callback function within the debugging program. The interrupt callback function is the debugger function which will handle interrupts. The operating system calls this function whenever one of the above interrupts occurs, and supplies an argument equal to the "number" of the interrupt.

It is possible for a number of different programs to register callback functions. Each interrupt callback function has the option of either handling the interrupt or passing it on to the next-registered callback function. Whether or not the exception has been handled is indicated by the response of the callback function. The operating system calls the registered callback functions in sequence until one of the callback functions resolves the interrupt. When an interrupt-handling routine is registered, it will be called for an exception generated by any program. A debugging program would choose to ignore an exception when, for example, it was generated by a program other than the program being debugged.

There are utility programs other than interactive debuggers which utilize the Tool Helper library to provide limited debugging information after system interrupts. These utilities typically operate similarly to the DRWATSN32.EXE program described above, providing varying degrees of static information about a program's state at the time of the system exception. To utilize the callback functions discussed above, however, these utilities must be running before interrupts occur. Furthermore, these utilities do not avoid termination of the faulting program. They do not make it possible for a programmer to interactively explore a program's data, register, and program storage areas as would be possible when running an interactive debugger such as Microsoft® CodeView® for Windows®, for example.

The ability to automatically invoke a debugging program after a program error has occurred would be extremely helpful to Windows® 3.1 developers. Such a feature would significantly decrease the time required to test new programs or modules. Since the Windows® 3.1 operating system is currently used by a very significant part of the personal computer market, having such a feature would be beneficial to thousands of software developers.

The invention described and claimed below allows an application program to be tested without a debugging program being previously launched. When debugging is needed, the debugging program is automatically installed, subject to the approval of the programmer, without terminating the application program. The debugging program is initialized to debug the active application program, with all program information still available and accessible. When using a debugging program such as CodeView® for Windows®, the programmer can interactively examine and alter data, and can also re-start or single-step through portions of the program as desired. This is a significant improvement over previous debugging methods under the Windows® 3.1 operating system which require a debugging program to be in memory and running prior to any program errors.

SUMMARY OF THE INVENTION

The invention allows "just-in-time" debugging of application programs. That is, it allows an interactive debugging program to be automatically loaded immediately after an application program error occurs, before the application program is terminated by the operating system. The preferred embodiment of the invention includes a just-in-time monitor program which resides in program memory concurrently with the running application program. The monitor program registers itself with the operating system, to be called by the operating system in response to exceptions generated by the application program. Upon being called in this manner, the monitor program first checks to see if a debugging program is already running. If one is, the monitor program returns and the operating system calls any remaining registered programs, such as the running debugging program. If, on the other hand, there are no currently running debugging programs, the monitor loads and starts a debugging program in a mode to debug the already-loaded application program. The monitor program then returns. The operating system the automatically calls the next-registered program, which is now the newly-registered debugging program. The debugging program handles the interrupt in its normal fashion.

DETAILED DESCRIPTION OF THE PREFERRED EMBODIMENT

The preferred embodiment of the invention is implemented under the Microsoft® Windows® 3.1 operating system. It will also function under the Microsoft® Windows® 3.0 operating system and under planned 16-bit subsets of un-released versions of the Windows® operating system. In the following discussion, references to the Windows® 3.1 operating system are intended to refer, in addition, to these other Windows® operating systems.

There are established conventions and techniques for programming under the Windows® 3.1 operating system, set forth in materials contained in the Microsoft® Windows® Software Development Kit, available from Microsoft® Corporation of Redmond, Wash., U.S.A. Most applications which run under the Windows® 3.1 operating system make extensive use of the Windows® applications programming interface (API). The Windows® API contains functions, explained in C-language format, for performing a variety of tasks under the Windows® 3.1 operating system. The Tool Helper functions discussed above are part of the Windows® API. Documentation for the Windows® API is found in the three volumes of the *Microsoft® Windows® Programmer's Reference,* Microsoft® Corporation, 1987–1992, which are hereby incorporated by reference. Further helpful explanations of the Tool Helper library functions can be found in Yao, *Explore Previously Uncharted Areas of Windows® Using the ToolHelp Library,* Microsoft® Systems Journal, May/June, 1992. This article is also incorporated by reference. A working familiarity with C-language programming, the Windows® 3.1 operating system, Windows® 3.1 programming, and the Windows® API is assumed in the following discussion.

Figure 1:
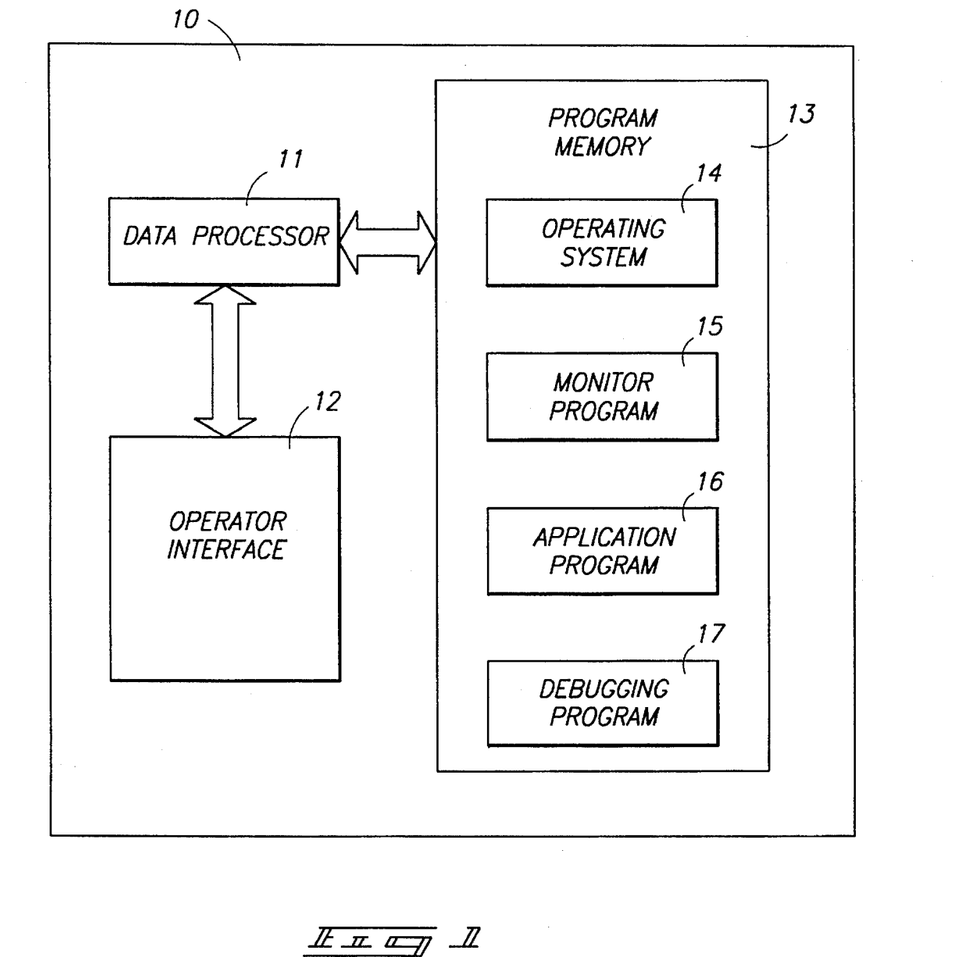
FIG. 1 is a block diagram of a debugging system in accordance with a preferred embodiment of the invention.

FIG. 1 shows a general-purpose computer system 10, configured as a debugging system, in accordance with a preferred embodiment of the invention. Computer system 10 includes a conventional data processor, microprocessor, or CPU 11 connected to access an operator interface 12 and program memory 13. Operator interface 12 comprises standard elements such as a keyboard, mouse or other pointing device, and a visual display. Program memory 13 comprises conventional DRAM (dynamic random access memory). Computer system 10 operates under a supervisory multitasking computer operating system 14, such the Windows® 3.1 operating system already discussed, which occupies portions of program memory 13.

The preferred methods of the invention are primarily performed, in conjunction with data processor 11 and operating system 14, by a just-in-time monitor program 15 residing in program memory 13. Just-in-time monitor program 15 has procedures for implementing a method of debugging an application program 16 running on data processor 11 under operating system 14. As discussed in the Background of the Invention section, the Windows® 3.1 operating system provides no support for launching a debugging program in response to exceptions generated by applications programs. While the Windows® 3.1 operating system does allow registration of a previously launched debugging program or other utility with an operating system exception handler, this requires that the debugging program be running and resident in program memory prior to registration. In contrast, the methods described below allow a debugging program, such as debugging program 17 shown, to be loaded into program memory 13 and executed after an exception is generated by an application program. The term "exception," as used herein, is meant to include any application program errors or system faults which are or can be identified by the operating system.

Figures 2, 3:
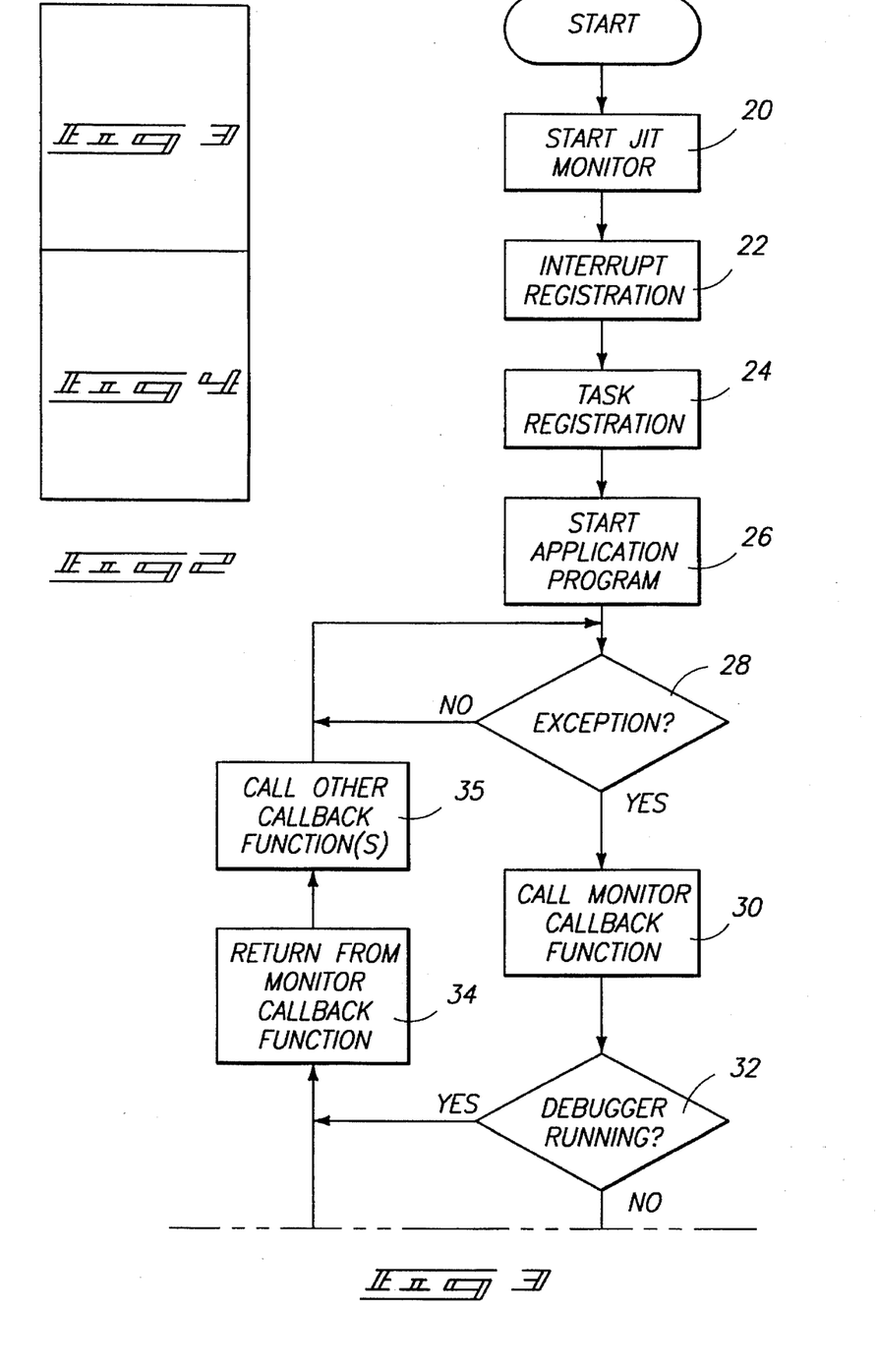
FIG. 2 is a legend showing the composite relationship of FIGS. 3 and 4.
FIGS. 3 and 4 are two portions of a flow chart showing preferred steps of the invention.
Figure 4:
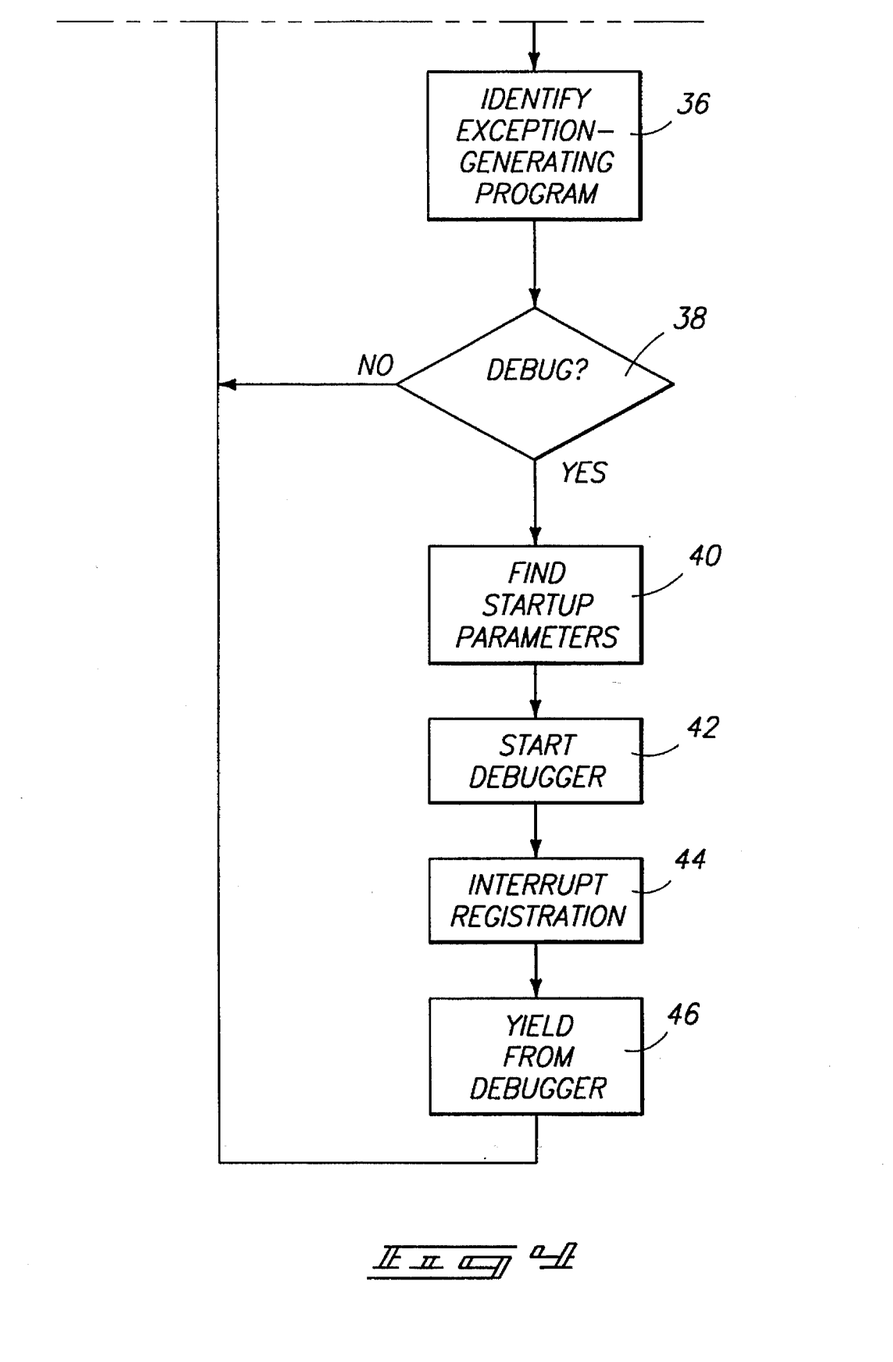

FIGS. 3 and 4 show the general steps of the preferred embodiment of the invention. A first step in accordance with the invention, indicated by reference numeral 20, comprises starting just-in-time (JIT) monitor program 15. The just-in-time monitor program is a small program which remains in program memory 13 while application program 16 is also running. Starting step 20 includes loading or installing the monitor program in program memory 13 and running it under Windows® 3.1 operating system 14. The monitor program consumes very little program memory and places few processing demands on the computer system. It thus avoids the problems sometimes encountered with debugging programs, wherein the debugging program interferes or alters the behavior of a target application program.

After being installed in program memory and started, the just-in-time monitor program performs a step 22 of registering itself with the operating system exception handler. As already discussed, the Windows® 3.1 operating system is of a type which allows registration of callback functions with an operating system exception handler, subject to the limitation that the callback functions must be resident in program memory prior to registration and must remain resident in program memory until they are called by the operating system. The exception handler then calls the callback functions in response to system exceptions. The callback functions are called in the order in which they were registered until there are no more registered callback functions or until one of the callback functions indicates that the exception has been handled or resolved.

The just-in-time monitor program includes a monitor callback function which is conventionally addressed by a first function or memory pointer. Registering step 22 is performed by passing the first function pointer to the Windows® 3.1 exception handler through a function call to the Tool Helper function InterruptRegister(). As a result of this call, the monitor callback function will be called in response to system interrupts associated with application program exceptions.

In a subsequent step 24, the monitor program registers itself with an operating system task handler. The Windows® 3.1 operating system has a task handler which allows registration of task callback functions in a fashion similar to the registration of interrupt callback functions. After such registration, the task handler calls the registered task callback functions in response to various task-related events.

The just-in-time monitor program includes a task callback function. Initialization steps within the monitor program include registering the task callback function with the operating system task handler so that the task handler will call the task callback function in response to starting and terminating programs. In the preferred embodiment, registration with the operating system task handler is implemented by a call to another Tool Helper function called NotifyRegister(). The call to NotifyRegister() includes, as an argument, a function or memory pointer to the task callback function of the just-in-time monitor program. Registering using the NotifyRegister() function allows the just-in-time monitor program to receive various messages and notifications regarding the starting and stopping of Windows® 3.1 modules and tasks. This allows the monitor program to determine whether a debugging program is running under the operating system. Specifically, the just-in-time monitor program looks for two types of task notifications: module delete notifications and module start notifications. After receiving either of these notifications, the monitor program examines all currently loaded modules, using appropriate Tool Helper functions such as ModuleFirst() and ModuleNext(), to identify any currently loaded debugging programs. The importance of having this information will become clear later in the discussion.

A subsequent step 26 in accordance with the invention includes launching an application or target program from within the operating system. In fact, this step might include launching and running a plurality of application programs, any one of such programs having the potential for generating an operating system exception. The monitor callback function of the just-in-time monitor program remains in memory while the application program or programs are running.

The invention includes the further step 28, performed automatically by the Windows® 3.1 operating system exception handler, of detecting any exceptions generated by application programs. In response to an exception, the operating system performs a step 30 of calling the monitor callback function of the just-in-time monitor program. Once called, the monitor callback function performs a step 32 of checking whether any debugging programs are already running. As already described with reference to step 24, the just-in-time monitor program uses Windows® 3.1 operating system task notification callback functions to monitor whether debugging programs are running. If a debugging program is already running, no action is taken. Rather, the monitor callback function returns with an retf instruction, in a step 34, indicating to the exception handler that the exception has not been handled. This gives other registered callback functions, such as an already-registered debugging program, the opportunity to handle the exception. Block 35 in FIG. 3 shows the operating system step of calling further registered callback functions in accordance with standard operating system characteristics.

If no debugging program is already running, the monitor callback function performs a step 36 of determining which application program generated the exception. This identification can be accomplished under the Windows® 3.1 operating system by a function call to GetCurrentTask(), a Windows® API function which retrieves and returns the handle of the currently running task. This task will be the one which generated the exception.

A subsequent step 38 is performed by the monitor callback function to determine whether the user wants to debug the application program which generated the exception. This would typically be in the form of a prompt or dialog box asking for a yes or no answer from the user. If the answer is no, execution proceeds to step 34, and the monitor callback function returns a value to the operating system indicating that the exception has not been handled. Other callback functions are given the opportunity to handle the exception in step 35.

If the user indicates that debugging is desired (the "yes" branch from step 38), the monitor callback function performs a step 40 of finding the startup command line parameters of the application program which generated the exception. The startup file name and path can be obtained by first calling the Windows® API function TaskFindHandle() to find the module handle of the current task, and by then calling the Windows® API function ModuleFindHandle(). ModuleFindHandle() fills a structure with information regarding a specified module. The structure includes an element named szExePath indicating the startup file name and path of the module. The command line arguments or "command tail" can be obtained by calling the Windows® API function GetCurrentPDB(). GetCurrentPDB() returns the selector address of the current MS-DOS program database (PDB, also known as the program segment prefix PSP). The PDB contains the command line arguments of the current program at offset 80 (hexadecimal). See Microsoft Corporation, *The MS-DOS Encyclopedia,* 1988, Appendix H, "Program Segment Prefix (PSP) Structure."

After finding the startup command line parameters of the program which generated the exception, the just-in-time monitor performs a step 42 of starting a debugging program. The debugging program is installed in program memory using a command line which includes appropriate command line arguments so that the debugging program can debug an application which is already loaded and running. Specifically, the debugging program is started with the Windows® API function WinExec() using command line arguments which instruct the debugging program to debug the running or suspended application program which generated the exception. In most cases, this will require supplying the startup command line parameters of the application program which generated the exception.

The preferred debugging program is of a type which allows interactive examination and modification of computer memory and registers, and which also allows a user to control program execution and flow. The debugging program further must be capable of debugging programs which are already running. In a more conventional environment, a debugging program would be started with command line parameters indicating the program to be debugged. The debugging program itself would then launch the application program using the Windows® API function LoadModule(). Here, however, there is no need for the debugging program to launch the application program. Rather, it must be given information which will enable it to "connect" to the already-running application program.

In the preferred embodiment described herein, the debugging program comprises slightly modified version of the Microsoft® CodeView® for Windows® window-oriented debugger. The debugging program is modified to accept a command line argument indicating that a running or suspended program is to be debugged. This argument is formatted as follows: "/JIT 1234:ABCD". The/JIT parameter indicates that just-in-time debugging, of an already loaded program, is to be performed. The variable 1234 is the Windows® task/process ID for the just-in-time monitor program. The variable ABCD is the Windows® task/process ID for the application program which generated the exception. These values are readily available using appropriate Tool Helper functions.

A command line for invoking the CodeView® for Windows® debugging program to debug Word for Windows® (winword.exe) when working on mydoc.doc would be as follows: "CVW /JIT 1234:ABCD c:\winword\winword.exe c:\mydir\mydoc.doc". "CVW" is the command used to start the CodeView® for Windows® debugging program. The "/JIT" parameter indicates to the debugging program that the other specified command line arguments (c:\winword\winword.exe c:\mydir\mydoc.doc) are the arguments previously used to start the application program which is to be debugged. When invoked with the /JIT parameter, the debugging program does not attempt to launch the specified target program. Rather, it completes any initializations which are necessary to begin debugging the already-loaded target program. The supplied task/process ID allows the debugging program to locate the target program.

The debugging program includes a debugger callback function. Upon being started, the debugging program performs a step 44 of registering its debugger callback function with the exception handler, to be called in response to application program exceptions. This registering step is similar to registering step 22 above. The debugger callback function is addressed by a second function pointer. Registering the debugger callback function comprises passing the second function pointer to the operating system exception handler through a call to InterruptRegister(). In accordance with the automatic operation of the operating system, the exception handler will then call the debugger callback function in response to exceptions generated by application programs. Since the debugger callback function is registered after the monitor callback function, the debugger callback function will be called automatically after the monitor callback function return, providing that the monitor callback function does not indicate to the exception handler that the exception has been handled or resolved.

This registration by the debugging program of an interrupt callback function is in accordance with the normal operational characteristics of debugging programs such as the CodeView® for Windows® window-oriented debugger.

Such programs typically operate by responding to operating system exceptions. Such exceptions might occur as the result of an inadvertent programming error, or as the result of artificial conditions generated by the debugging program for the specific purpose of generating an exception. Further normal characteristics of such debugging programs include, as indicated by step 46, yielding control to the operating system after performing internal initialization functions.

A subsequent step comprises returning from the monitor callback function without indicating to the operating system exception handler that the exception has been resolved. This is step 34 in FIG. 3. Specifically, the monitor callback function returns via an retf instruction, which the operating system interprets to mean that the exception was not resolved by the monitor callback function, and that any further registered callback functions should be called. Since the debugger callback function is now registered with the exception handler, step 35, which follows step 34, includes calling the debugger callback function to initiate interactive debugging of the application which generated the exception. The debugging program can handle the exception in any way in which it normally handles such exceptions, with no further involvement by the monitor program. In fact, the step 32 of checking whether any debugger is running prevents the monitor program from interfering with debugging operations, which rely to a great degree on naturally occurring and artificially generated exceptions. The steps of FIGS. 3 and 4 from step 28 through step 46 are repeated for every generated exception.

Figure 5:
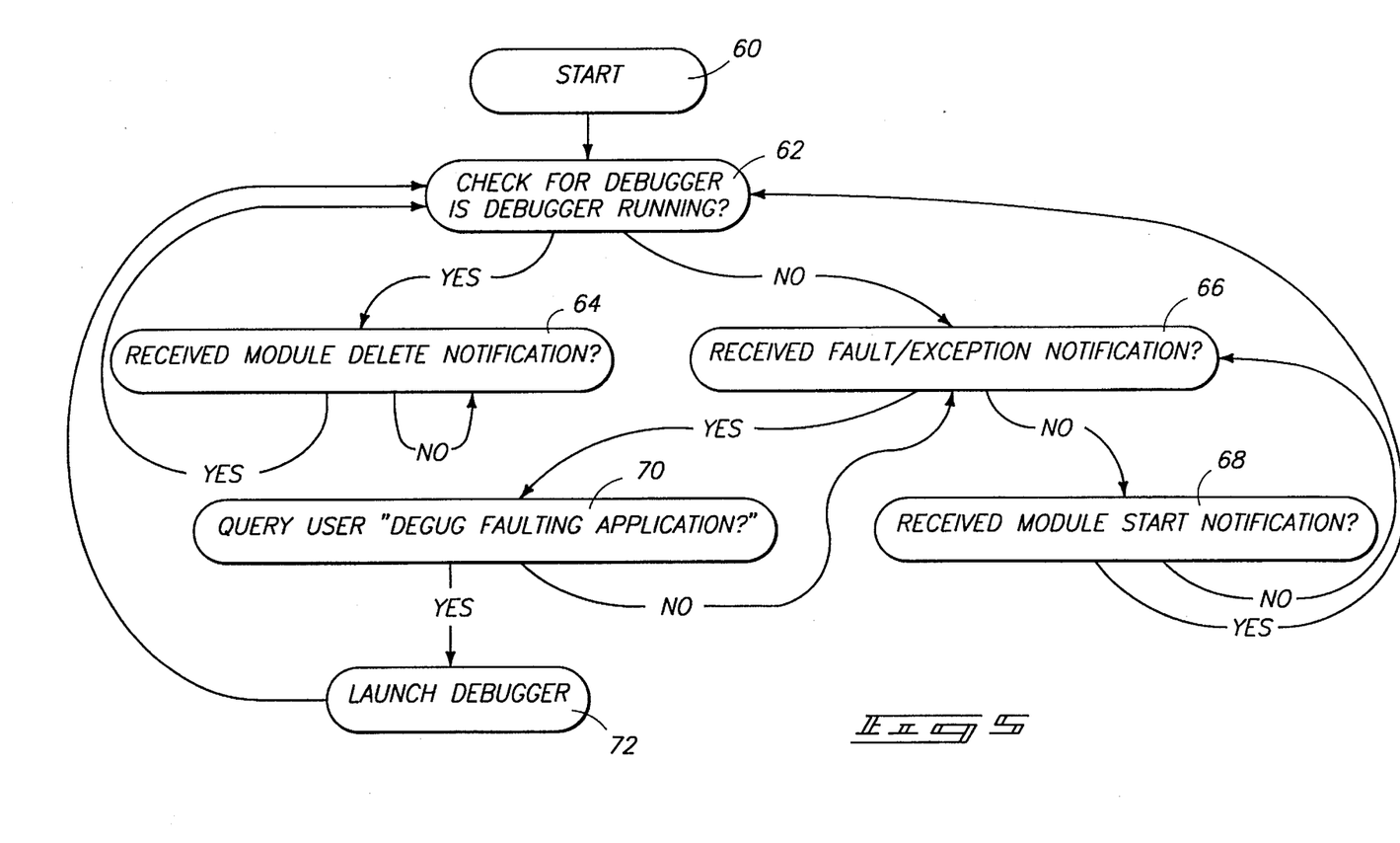
FIG. 5 is a state diagram showing the state characteristics of the preferred embodiment of the invention.

FIG. 5 organizes the steps and procedures of the invention in a state diagram. State 60 indicates the various initialization steps, such as starting the monitor program, performing the interrupt and task registrations of the monitor program, and launching one or more application programs. State 62 is a decision regarding whether any debuggers are already running under the operating system. If they are, the process continues to state 64. State 64 monitors whether any modules are deleted. This determination relies on notifications from the operating system task manager as already discussed. The process remains in this state until a module delete notification is received, when state 62 is re-entered to determine whether any debugging programs are now running.

If no debugging programs are now running, the process enters a state 66 which monitors whether any exceptions have been generated. This relies on the notification functions of the operating system exception handler. If no exceptions have been generated, the process enters state 68. State 68 relies on task manager notifications to monitor whether any modules have been started. If they have, the process returns to state 62 to determine whether any debugging programs are now running. If no new modules have been started, the process returns to state 66 to monitor for exception notifications.

Upon receiving an exception notification in state 66, the process enters a state 70 which queries a user whether debugging is desired. If no debugging is desired, the process returns to state 66 to monitor for further exception notifications. If, however, debugging is desired, a debugging program is launched in a state 72, whereupon the process returns to state 62.

Despite the recognized desirability of providing a debugger which starts only after an exception is detected, there has previously been no known way of accomplishing this in the Windows® 3.0 and 3.1 environments. The invention thus meets a need which has been present for several years.

The monitor program described above is small enough to be kept running at all times in a software development environment. Thus, the software developer does not need to think about whether to invoke a debugger prior to testing application program modifications. The developer can simply run the application program, and decide after an exception occurs whether to invoke the debugger. After invoking the debugger, the target program is just as intact as it would have been had the debugger been running all along.

In compliance with the patent statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of debugging an application program running under an operating system on a computer, the operating system being of a type which allows registration of callback functions with an operating system exception handler, the exception handler calling said callback functions in response to an exception generated by the application program, the method comprising the following steps:

starting a monitor program on the computer, the monitor program including a monitor callback function;

registering the monitor callback function with the operating system exception handler;

calling the monitor callback function from the operating system exception handler in response to an exception generated by an application program;

in response to calling the monitor callback function, starting a debugging program to debug the application program which generated the exception.

2. A method as recited in claim 1 wherein the monitor callback function is addressed by a function pointer, the step of registering the monitor callback function comprising passing said function pointer to the exception handler.

3. A method as recited in claim 1 wherein the step of starting the monitor program includes installing the monitor callback function in program memory, the monitor callback function remaining in memory while the application program is running.

4. A method as recited in claim 1 wherein:

the step of starting the monitor program includes installing the monitor callback function in program memory;

the method further comprises retaining the monitor callback function in memory while the application program is running;

the monitor callback function is addressed by a function pointer; and the step of registering the monitor callback function comprises passing said function pointer to the exception handler.

5. A method as recited in claim 1 wherein the monitor callback function performs an additional step of checking whether any debugging programs are already running, the step of starting the debugging program being performed only if there are no debugging programs already running.

6. A method as recited in claim 1 wherein the operating system is also of a type which allows registration of callback functions with a task handler, the method further comprising calling said callback functions from the task handler in response to task-related events, the monitor program having a task callback function, the monitor program performing a step of registering the task callback function with the task handler to call the task callback function in response to starting and terminating programs, the monitor program performing an additional step of monitoring whether any debugging programs are already running, the step of starting the debugging program being performed only if there are no debugging programs already running.

7. A method as recited in claim 1 and further comprising using notification callback functions to monitor whether any debugging programs are running, the step of starting the debugging program being performed only if there are no debugging programs already running.

8. A method of debugging an application program running under an operating system on a computer, the operating system being of a type which allows registration of callback functions with an operating system exception handler, the exception handler calling said callback functions in response to an exception generated by the application program until there are no more registered callback functions or until one of said callback functions indicates that the exception has been resolved, the method comprising the following steps:

starting a monitor program on the computer, the monitor program including a monitor callback function;

registering the monitor callback function with the operating system exception handler;

calling the monitor callback function from the operating system exception handler in response to an exception generated by an application program;

in response to calling the monitor callback function, starting a debugging program to debug the application program which generated the exception, the debugging program including a debugger callback function;

upon being started, the debugging program performing steps of registering its debugger callback function with the exception handler and then yielding to the operating system;

returning from the monitor callback function without indicating to the operating system exception handler that the exception has been resolved, wherein the exception handler then calls the debugger callback function to initiate debugging of the application which generated the exception.

9. A method as recited in claim 8 wherein the monitor callback function is addressed by a function pointer, the step of registering the monitor callback function comprising passing said function pointer to the exception handler.

10. A method as recited in claim 8 wherein the step of starting the monitor program includes installing the monitor callback function in program memory, the monitor callback function remaining in program memory while the application program is running.

11. A method as recited in claim 8 wherein:

the step of starting the monitor program includes installing the monitor callback function in program memory;

the method further comprises retaining the monitor callback function in program memory while the application program is running;

the monitor callback function is addressed by a function pointer;

the step of registering the monitor callback function comprises passing said function pointer to the exception handler.

12. A method as recited in claim 8 and comprising a further step of checking whether any debugging programs are already running, the step of starting the debugging program being performed only if there are no debugging programs already running.

13. A method as recited in claim 8 wherein the operating system is also of a type which allows registration of callback functions with a task handler, the method further comprising calling said callback functions from the task handler in response to task-related events, the monitor program having a task callback function, the monitor program performing a step of registering the task callback function with the task handler to call the task callback function in response to starting and terminating programs.

14. A method as recited in claim 8 wherein the operating system is also of a type which allows registration of callback functions with a task handler, the method further comprising calling said callback functions from the task handler in response to task-related events, the monitor program having a task callback function, the monitor program performing a step of registering the task callback function with the task handler to call the task callback function in response to starting and terminating programs, the monitor program performing an additional step of monitoring whether any debugging programs are already running, the step of starting the debugging program being performed only if there are no debugging programs already running.

15. A method as recited in claim 8 and further comprising using notification callback functions to monitor whether any debugging programs are running, the step of starting the debugging program being performed only if there are no debugging programs already running.

16. A method as recited in claim 8 wherein the step of starting the debugging program includes supplying the debugging program with startup parameters of the application program which generated the exception.

17. A method as recited in claim 8 wherein the step of registering the monitor callback function comprises passing a first function pointer to the exception handler and the step of registering the debugger callback function comprises passing a second function pointer to the exception handler.

18. A method of debugging an application program running under an operating system on a computer, the computer having program memory, the operating system being of a type which allows registration of callback functions with an operating system exception handler, the exception handler calling said callback functions in response to an exception generated by the application program until there are no more registered callback functions or until one of said callback functions indicates that the exception has been resolved, the method comprising the following steps:

installing a monitor program in the computer's program memory, the monitor program including a monitor callback function which is addressed by a first function pointer, the monitor callback function remaining in program memory while the application program is running;

passing the first function pointer to the operating system exception handler to register the monitor callback function with the exception handler;

calling the monitor callback function from the exception handler in response to an exception generated by an application program;

the monitor callback function performing a step of determining which application program generated the exception;

the monitor callback function perforating a further step of finding the startup parameters of the application program which generated the exception;

starting a debugging program from the monitor callback function to debug the application program which generated the exception if no debugging programs are already running, the debugging program including a debugger callback function, the monitor callback function supplying the startup parameters of the application program which generated the exception to the debugging program;

upon being started, the debugging program performing steps of registering its debugger callback function with the exception handler and then yielding to the operating system;

returning from the monitor callback program without indicating to the operating system exception handler that the exception has been resolved;

calling the debugger callback function from the exception handler after calling the monitor callback function to initiate debugging of the application program which generated the exception.

19. A method as recited in claim 18 wherein the operating system is also of a type which allows registration of callback functions with a task handler, the method further comprising calling said callback functions from the task handler in response to task-related events, the monitor program having a task callback function, the monitor program performing a step of registering the task callback function with the task handler to call the task callback function in response to starting and terminating programs.

20. A method as recited in claim 18, the debugger callback function being addressed by a second function pointer, wherein registering the debugger callback function comprises passing the second function pointer to the exception handler.

21. A method as recited in claim 18 wherein starting the debugging program includes installing the debugger callback function in program memory.

22. A method as recited in claim 18 and further comprising using notification callback functions to monitor whether any debugging programs are running.

23. A debugging system comprising:

a computer having program memory;

a supervisory computer operating system executing on the computer;

the computer operating system having an exception handler which allows registration of callback functions, the exception handler having procedures to call said callback functions in response to an exception generated by an application program;

a monitor program executing on the computer, the monitor program having a monitor callback function, the monitor callback function being installed in the computer's program memory and being registered with the operating system exception handler to be called in response to an exception generated by an application program;

a debugging program executing on the computer;

the monitor program having procedures which are executed upon the monitor callback function being called by the operating system exception handler to start the debugging program to debug the application program which generated the exception.

24. A debugging system as recited in claim 23 wherein the computer operating system is of a type which requires callback functions to be resident in the computer's program memory prior to registration with the exception handler.

25. A debugging system as recited in claim 23 wherein the computer operating system is of a type which requires function pointers to registered callback functions.

26. A debugging system as recited in claim 23 wherein the computer operating system is of a type which requires callback functions to be resident in the computer's program memory prior to registration with the exception handler and to remain resident in memory until called by the exception handler.

27. A debugging system as recited in claim 23 wherein the monitor program has further procedures which are executed when the monitor callback function is called by the operating system exception handler to check whether any debugging programs are already running and to start the debugging program only if there are no debugging programs already running.

28. A debugging system as recited in claim 23 wherein:

the computer operating system has a task handler which allows registration of callback functions, the task handler having procedures to call said callback functions in response to task-related events;

the monitor program having a task callback function;

the monitor program having procedures to register the task callback function with the task handler to be called in response to starting and terminating programs, to monitor whether any debugging programs are already running, and to start the debugging program only if there are no debugging programs already running.

29. A debugging system comprising:

a computer having program memory;

a supervisory computer operating system executing on the computer;

the computer operating system having an exception handler which allows registration of callback functions, the exception handler having procedures to call said callback functions in response to an exception generated by an application program until there are no more registered callback functions or until one of said callback functions indicates that the exception has been resolved;

a monitor program executing on the computer, the monitor program having a monitor callback function, the monitor callback function being installed in the computer's program memory and being registered with the operating system exception handler to be called in response to an exception generated by an application program;

a debugging program executing on the computer, the debugging program having a debugger callback function;

the monitor program having procedures which are executed upon the monitor callback function being called by the operating system exception handler to start the debugging program to debug the application program which generated the exception;

the debugging program having procedures which are executed upon being started to register the debugger callback function with the operating system exception handler and to then yield to the operating system;

the monitor program having further procedures which are executed after starting the debugging program to return from the monitor callback function without indicating to the operating system exception handler that the exception has been resolved, wherein the exception handler then calls the debugger callback function to initiate debugging of the application which generated the exception.

30. A debugging system as recited in claim 29 wherein the computer operating system is of a type which requires callback functions to be resident in the computer's program memory prior to registration with the exception handler.

31. A debugging system as recited in claim 29 wherein the computer operating system is of a type which requires function pointers to registered callback functions.

32. A debugging system as recited in claim 29 wherein the computer operating system is of a type which requires callback functions to be resident in program memory prior to registration with the exception handler and to remain resident in memory until called by the exception handler.

33. A debugging system as recited in claim 29 wherein the monitor program has further procedures which are executed when the monitor callback function is called by the operating system exception handler to check whether any debugging programs are already running and to start the debugging program only if there are no debugging programs already running.

34. A debugging system as recited in claim 29 wherein:

the computer operating system has a task handler which allows registration of callback functions, the task handler having procedures to call said callback functions in response to task-related events;

the monitor program having a task callback function;

the monitor program having procedures to register the task callback function with the task handler to be called in response to starting and terminating programs, to monitor whether any debugging programs are already running, and to start the debugging program only if there are no debugging programs already running.

\* \* \* \* \*